(12) United States Patent
Cheng

(10) Patent No.: US 6,912,011 B2
(45) Date of Patent: Jun. 28, 2005

(54) METHOD AND SYSTEM FOR MEASURING AUDIO AND VIDEO SYNCHRONIZATION ERROR OF AUDIO/VIDEO ENCODER SYSTEM AND ANALYZING TOOL THEREOF

(75) Inventor: Kung Cheng, Taichung (TW)

(73) Assignee: Winbond Electronics Corp., Hsinchu (TW)

( * ) Notice: Subject to any disclaimer, the term of this patent is extended or adjusted under 35 U.S.C. 154(b) by 497 days.

(21) Appl. No.: 10/187,106

(22) Filed: Jun. 28, 2002

(65) Prior Publication Data

US 2003/0112249 A1 Jun. 19, 2003

(30) Foreign Application Priority Data

Dec. 13, 2001 (TW) ........................................ 90130970 A

(51) Int. Cl.$^7$ .............................................. H04N 9/475
(52) U.S. Cl. ...................................... 348/515; 348/512
(58) Field of Search ................................ 348/515, 512, 348/518, 513, 484, 510, 423.1; H04N 9/475

(56) References Cited

U.S. PATENT DOCUMENTS

| | | | | | |
|---|---|---|---|---|---|
| 5,661,728 A | * | 8/1997 | Finotello et al. | ............ | 348/515 |
| 5,815,634 A | * | 9/1998 | Daum et al. | ................ | 348/515 |
| 5,874,997 A | * | 2/1999 | Haigh | ......................... | 348/515 |
| 6,836,295 B1 | * | 12/2004 | Cooper | ....................... | 348/515 |

* cited by examiner

*Primary Examiner*—Sherrie Hsia
(74) *Attorney, Agent, or Firm*—Haverstock & Owens LLP

(57) ABSTRACT

A method for measuring audio and video synchronization error of an audio/video encoder system is provided. The method includes steps of: producing a reference video data having a first time length and including a particular image pattern and a reference audio data having a second time length; inputting the reference video data and the reference audio data into the audio/video encoder system to produce an encoded video data and an encoded audio data; processing the encoded video data and the encoded audio data respectively to produce a detected video data having the first time length and including the particular image pattern and a detected audio data having the second time length; and detecting a first time point of an audio data of the reference audio data synchronized with the particular image pattern of the reference video data and a second time point of an audio data of the detected audio data synchronized with the particular image pattern of the detected video data by an analyzing tool, and calculating a difference between the first time point and the second time point.

20 Claims, 3 Drawing Sheets

METHOD AND SYSTEM FOR MEASURING AUDIO AND VIDEO SYNCHRONIZATION ERROR OF AUDIO/VIDEO ENCODER SYSTEM AND ANALYZING TOOL THEREOF

FIELD OF THE INVENTION

This invention relates to a method and system for measuring audio and video synchronization error of an audio/video (AV) encoder system, and more particularly to a technology for utilizing an analyzing tool recorded in a computer readable media to analyze the audio and video synchronization difference and time point of an audio/video (AV) encoder system.

BACKGROUND OF THE INVENTION

Nowadays, the technologies for compressing every kind of audio and video signals are developed gradually and applied in many television and broadcasting stations. And all these maximize the number of the video frame. Moving Picture Experts Group (MPEG) already promulgated several standards relative to the digital data transmitting system. The first known system is MPEG-1, also called ISO/IEC standard 11172, and the second standard is MPEG-2, also called ISO/IEC standard 13818. Theses known standards are formulated to compress audio and video signals.

The function of the MPEG encoder system is transforming the dynamic audio and video data into the standard MPEG system stream. What is called MPEG system stream is to record audio and video data on a series of 0 and 1 signals in the video playing media (e.g., video recorder, digital video disk (DVD), cable, or wireless transmission).

When playing the MPEG AV signal, if there is an asynchronous situation between the audio and video signals of the produced MPEG system stream, even a difference of 0.1 second is possible to be observed for a sensitive observer. Thus, for the MPEG encoder system, testing and verifying the synchronization of audio and video signals is a very important work. However, depending on an artificial manner to observe the difference of the audio and video signals is not objective and accurate and is a manpower consuming and tedious work.

SUMMARY OF THE INVENTION

It is an object of the present invention to provide a method for measuring the audio and video synchronization error of an AV encoder system.

It is another object of the present invention to provide a detecting system for measuring audio and video synchronization error of an AV encoder system achieved by a software.

It is another further object of the present invention to provide a computer program product recorded on a computer readable media for receiving the system stream produced by the AV encoder system and analyzing the arising time point and the difference of the synchronization error between the audio and video outputs.

The present invention provides a method for measuring audio and video synchronization error of an audio/video encoder system. The method includes the steps of: (a) producing a reference video data having a first time length and including a particular image pattern, and a reference audio data having a second time length; (b) inputting the reference video data and the reference audio data into the audio/video encoder system to produce an encoded video data and an encoded audio data; (c) processing the encoded video data and the encoded audio data respectively to produce a detected video data having the first time length and including the particular image pattern and a detected audio data having the second time length; and (d) detecting a first time point of an audio data of the reference audio data synchronized with the particular image pattern of the reference video data and a second time point of an audio data of the detected audio data synchronized with the particular image pattern of the detected video data by an analyzing tool, and calculating an difference between the first time point and the second time point.

Preferably, the step (c) further comprises steps of: (c1) demultiplexing the encoded video data and the encoder audio data respectively to produce an encoded video stream and an encoded audio stream; and (c2) decoding the encoded video stream and the encoded audio stream to produce the detected video data having the first time length and including the particular image pattern, and the detected audio data having the second time length.

Preferably, the particular image pattern occupies a part of a video frame in the reference video data.

Preferably, the first time length is a multiple of the second time length.

In accordance with another aspect of the present invention, a method for measuring audio and video synchronization error of an audio/video encoder system includes the steps of: (a) producing a reference video data having a first time length and a reference audio data having a second time length and including a particular audio pattern; (b) inputting the reference video data and the reference audio data into the audio/video encoder system to produce an encoded video data and an encoded audio data; (c) processing the encoded video data and the encoded audio data respectively to produce a detected video data having the first time length and a detected audio data having the second time length and including the particular audio pattern; and (d) detecting a first time point of a video data of the reference video data synchronized with the particular audio pattern of the reference audio data and a second time point of a video data of the detected video data synchronized with the particular audio pattern of the detected audio data by an analyzing tool, and calculating a difference between the first time point and the second time point.

Preferably, the step (c) further comprises steps of: (c1) demultiplexing the encoded video data and the encoded audio data respectively to produce an encoder video stream and an encoded audio stream; and (c2) decoding the encoded video stream and the encoded audio stream to produce the detected video data having the first time length and the detected audio data having the second time length and including the particular audio pattern.

Preferably, the first time length is a multiple of the second time length.

In accordance with further an aspect of the present invention, a system for measuring audio and video synchronization error of an audio/video encoder system includes: an audio/video data supplying device for providing a reference video data having a first time length and including a particular image pattern, and a reference audio data having a second time length; an audio/video encoder system for receiving the reference video data having the first time length and including the particular image pattern and the reference audio data having the second time length and producing an encoded video data and an encoded audio data; and a data processing device comprising a readable media wherein recording a computer program product is to receive the encoded video data and the encoded audio data, produce a detected video data having the first time length and including the particular image pattern and a detected audio data having the second time length, detect a first time point of an audio data included in the reference audio data synchronized with the particular image pattern included in the reference video data and a second time point of an audio data included in the detected audio data synchronized with the particular image pattern included in the detected video data, and calculate a difference between the first time point and the second time point.

Preferably, the audio/video data supplying device is one of a video CD player and a digital video disk player.

Preferably, the system further comprises an audio/video playing device for transmitting the reference video data and the reference audio data to the audio/video encoder system via a video output interface.

Preferably, the audio/video encoder system is an encoder system of Moving Picture Experts Group (MPEG).

Preferably, the data processing device is a personal computer.

Preferably, the readable media is one of a fixed storage device and a removable storage device.

Preferably, the first time length is a multiple of the second time length.

Preferably, the computer program product comprises an analyzing tool. The analyzing tool includes: an analyzing device for receiving the encoded video data and the encoded audio data and producing a video stream and an audio stream; an audio decoder device for receiving the audio stream and outputting the detected audio data having the second time length; a video decoder device for receiving the video stream and outputting said detected video data having the first time length including the particular image pattern; and an analyzing program, comprising a series of operation instructions for detecting a first time point of an audio data of the reference audio data synchronized with the particular image pattern of the reference video data and a second time point of an audio data of the detected audio data synchronized with the particular image pattern of the detected video data and calculating a difference between the first time point and the second time point.

In accordance with a further aspect of the present invention, a system for measuring audio and video synchronization error of an audio/video encoder system includes: an audio/video data supplying device for providing a reference video data having a first time length and a reference audio data having a second time length and including a particular audio pattern; an audio/video encoder system for receiving the reference video data having the first time length and the reference audio data having the second time length and including the particular audio pattern and producing an encoded video data and an encoded audio data; and a data processing device comprising a readable media wherein recording a computer program product is to receive the encoded video data and the encoded audio data, produce a detected video data having the first time length and a detected audio data having the second time length and including the particular audio pattern, detect a first time point of a video data included in the reference video data synchronized with the particular audio pattern included in the reference audio data and a second time point of a video data included in the detected video data synchronized with the particular audio pattern included in the detected audio data, and calculate a difference between the first time point and the second time point.

Preferably, the system further comprises a video-plying device for transmitting the reference audio data and the reference video data to the audio/video encoder system via a video output interface.

Preferably, the computer program product comprises an analyzing tool. The analyzing tool includes: an analyzing device for receiving the encoded video data and the encoded audio data and producing a video stream and an audio stream; an audio decoder device for receiving the audio stream and outputting the detected audio data having the second time length and including the particular audio pattern; a video decoder device for receiving the video stream and outputting the detected video data having the first time length; and a series of operation instructions for detecting a first time point of a video data of the reference video data synchronized with the particular audio pattern of the reference audio data and a second time point of a video data of the reference video data synchronized with the particular audio pattern of the reference audio data, and calculating a difference of the first time point and the second time point.

In accordance with an additional aspect of the present invention, an analyzing tool stored in a computer program product includes: an analyzing device for receiving a reference video data having a first time length and including a particular image pattern and a system stream produced by the reference audio data having a second time length via an audio/video encoder system and producing a video stream and an audio stream; an audio decoder device for receiving the audio stream and outputting a detected audio data; a video decoder device for receiving the video stream and outputting a detected video data including the particular image pattern and having the first time length; and an analyzing program comprising a series of operation instructions for detecting a first time point of an audio data of the reference audio data synchronized with the particular image pattern of the reference video data and a second time point of an audio data of the reference audio data synchronized with the particular image pattern of the reference video data and calculating a difference of the first time point and the second time point.

In accordance with additional an aspect of the present invention, an analyzing tool stored in a computer program product includes: an analyzing device for receiving a reference video data having a first time length and a system stream produced by the reference audio data having a second time length and including a particular audio pattern via an audio/video encoder system and producing a video stream and an audio stream; an audio decoder device for receiving the audio stream and outputting a detected audio data; a video decoder device for receiving the audio stream and outputting a detected audio data comprising the particular audio pattern and having the second time length; and an analyzing program comprising a series of operation instructions for detecting a first time point of a video data of the reference video data synchronized with the particular audio pattern of the reference audio data and a second time point of a video data of the reference video data synchronized with the particular audio pattern of the reference audio data and calculating a difference of the first time point and the second time point.

The above objects and advantages of the present invention will become more readily apparent to those ordinarily skilled in the art after reviewing the following detailed descriptions and accompanying drawings, in which:

DETAILED DESCRIPTION OF THE PREFERRED EMBODIMENT

The method and system for measuring audio and video synchronization error of an AV encoder system and the analyzing tool thereof will be concrete through the following preferred embodiments. In the preferred embodiments according to the present invention, an MPEG compliant system which is based on the AV compressing standard which is standardized by the MPEG is adapted as a preferred AV encoder system to illustrate the technology of measuring audio and video synchronization error of an AV encoder system in the present invention. However, any AV encoder system adopting an AV compressing technology which will not lose the sense of reality after decoding the encoded AV data can be the AV encoder system in the present invention and will not escape from the protecting scope of the present invention.

Figure 1:
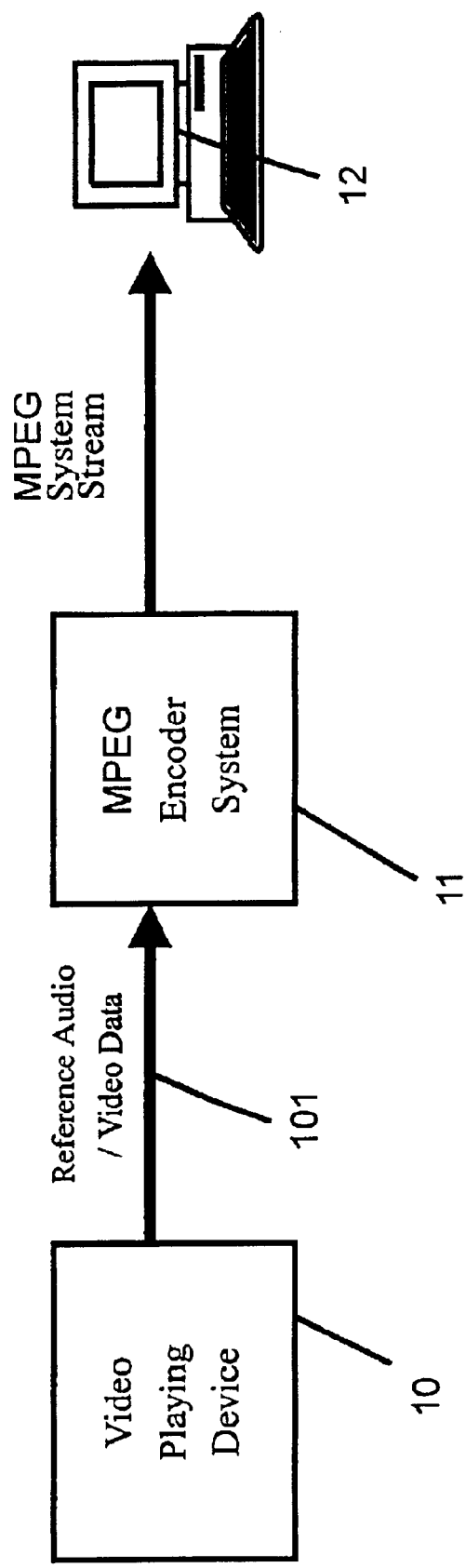
FIG. 1 shows a system for measuring the audio and video output synchronization error of MPEG encoder system in a preferred embodiment according to the present invention.

Please refer to FIG. 1. The technology of measuring audio and video synchronization error according to the present invention adopts specific designed audio and video patterns as a reference AV data source of the AV encoder system. Then, utilizing the analyzing package program to decode the system stream produced by the MPEG encoder system and analyzing the AV data which is encoded by the MPEG encoder system and then decoded. It means that the asynchronous time point and difference of the decoded AV data in the audio and video regions can be automatically and rapidly judged. In FIG. 1, the system for measuring audio and video output synchronization error of the AV encoder system in a preferred embodiment according to the present invention includes a video playing device 10, such as VCD player, CD-ROM, or DVD player. The video-playing device 10 can be used to play an AV storing media on which an AV data source is recorded, such as a compact disk (CD) or a digital video disk (DVD). The AV data source recorded on the video playing device 10 is an analog audio/video pattern designed specifically, and can be a reference audio/video data for measuring audio and video output synchronization error of AV an encoder system. These reference audio/video data will be transmitted to an MPEG encoder system 11 through an audio/video output interface 101 to process the audio/video encoded procedure.

According to a preferred embodiment in the present invention, the contents of the reference video data can be designed to place different image patterns into every video frame within an appropriate time length Vt, such as 30 seconds. For instance, in NTSC video data system, the video frame period is ⅓₀ second, namely there are thirty video frames in one second. Within thirty seconds, there must be 30*30=900 video frames and need 900 different video patterns to be arranged in every video frame separately. On the other way, in a PAL video data system, the video frame period is ¹⁄₂₅ second, namely there are twenty-five video frames in one second. Within twenty-five seconds, there must be 25*25=625 video frames and need 625 different video patterns to be arranged in every video frame separately. The selection rule of these video patterns is that after encoded by MPEG encoder system 11 and then decoded, there still are sufficient data supplied for judging the audio and video output synchronization error or accuracy of MPEG encoder system 11 appropriately. Simultaneously, the video pattern doesn't need to fill up the whole video frame and only need to fill up the region sufficient to judge the audio and video output synchronization accuracy of the MPEG encoder system and then the other region of the video frame can be occupied by general dynamic images. In the preferred embodiment according to the present invention, the appropriate time length Vt of the reference video data is set as 30 seconds. However, the 30 second long reference video data also can be repeated one length after another to produce long time reference video data.

According to a preferred embodiment in the present invention, the contents of the reference audio data can be designed to place different audio patterns in every adjacent length unit within an appropriate time length At, such as 30 seconds. Thus, two different kinds of audio patterns are needed. Take At equal to 30 seconds as an example, quiet sound for 30 seconds and monosyllable sound for 30 seconds or other audio data which can be recognized are placed in left or right channel and the other channels can be replaced by general audio data. The selection rule of these audio patterns is that after encoded by MPEG encoder system 11 and then decoded, there still are sufficient data supplied for judging the audio and video output synchronization accuracy of the MPEG encoder system 11 appropriately. In the preferred embodiment according to the present invention, the appropriate time length At of the reference audio data is set as 30 seconds or as the factor of Vt. However, the audio data having appropriate time length can be repeated one length after another to produce long time reference audio data.

After MPEG encoder system 11 conforms to the MPEG video standard, contrasts to the reference video data, conforms to the MPEG audio standard and contrasts to the reference audio data and encodes, an MPEG system stream will be outputted to a data processing device 12. The data processing device 12 will process the MPEG system stream and judge the video and audio encoded data synchronization accuracy outputted from the MPEG encoder system 11. The preferred one for the data processing device 12 is a personal computer and includes a readable media (which is not shown). The MPEG system stream can be an AV encoded synchronization accuracy analyzing package software in a fixable storing device (e.g., hard disk or compact disk player) or a removable storing device (e.g., a flash memory) to process the analyzing procedure of MPEG audio and video outputs of MPEG encoder system 11 through the readable media recorded on the data processing device 12.

Figure 2:
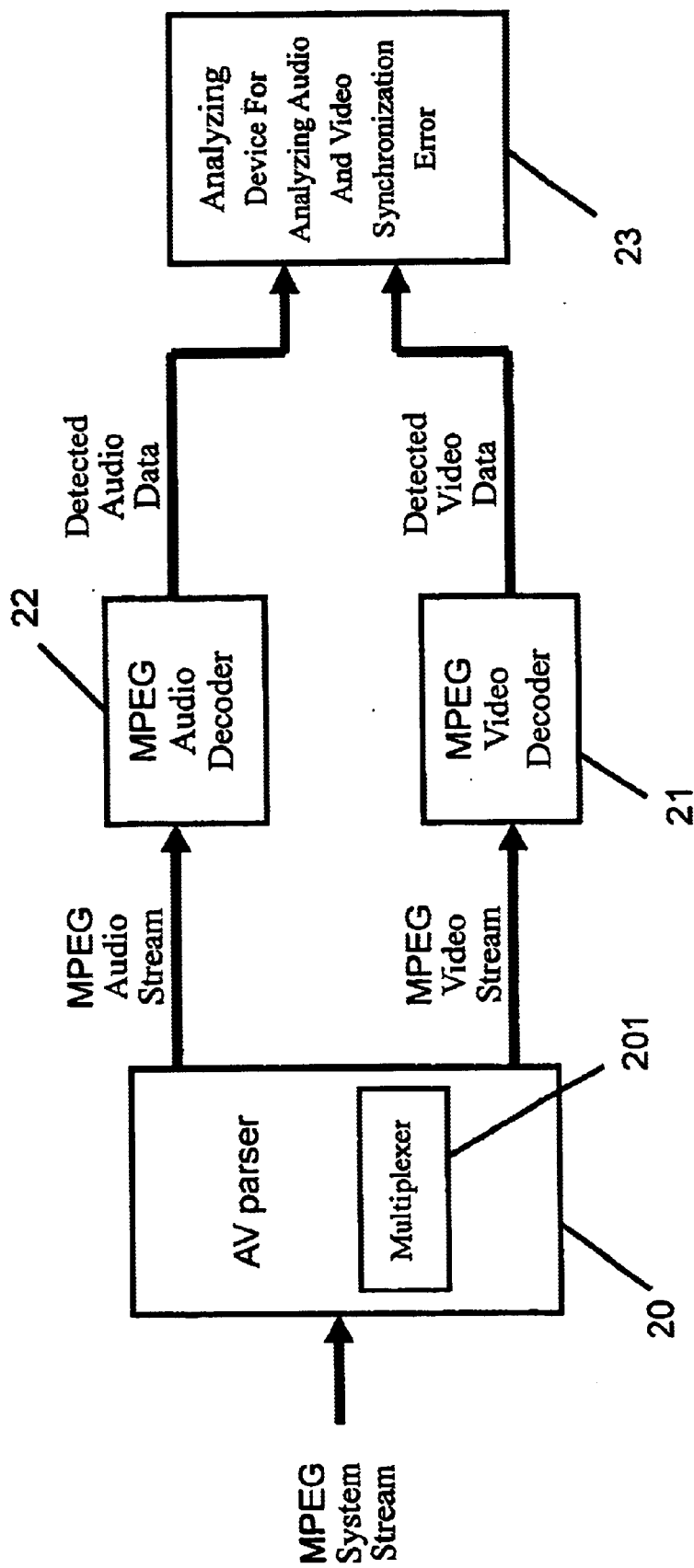
FIG. 2 shows an analyzing tool for measuring the audio and video output synchronization error of MPEG encoder system to be achieved by software in a typical embodiment according to the present invention.

Please refer to FIG. 2 showing the analyzing tool for measuring audio and video output synchronization accuracy of MPEG encoder system to be achieved by a software. As explained above, in FIG. 1, the system stream outputted by MPEG encoder system 11 will be transmitted to the data processing device 12. A readable media in the data processing device 12 has an analyzing package program which can be the analyzing tool for measuring audio and video output synchronization accuracy of MPEG encoder system 11. As shown in FIG. 2, the analyzing tool of audio and video signal synchronization accuracy of the MPEG encoder system includes plural software programs and every software program is in configuration set to complete a particular task. The analyzing tool comprises an AV parser 20 for receiving the output MPEG system stream of MPEG encoder system 11 in FIG. 1. And through a multiplexer 201 included in the MPEG encoder system, the MPEG system stream will demultiplex an MPEG video stream, namely the MPEG video bit stream and an MPEG audio stream, namely MPEG audio bit stream. MPEG video decoder 21 and MPEG audio decoder 22 both include plural registers, bit buffers, controllers and core circuits. MPEG video decoder 21 and MPEG audio decoder 22 will decompress the compressed video data packet and compressed audio data packet outputted from MPEG encoder system 11 and output a detected video data and a detected audio data.

To achieve the purpose described above of the present invention, the analyzing tool of audio and video output synchronization accuracy of the MPEG encoder system further comprises an analyzing device 23 completed by an analyzing program. The analyzing device includes an algorithm instruction and the algorithm instruction can be executed to detect the synchronization of the detected video and audio data of MPEG encoder system 11 and calculate the difference of the audio and video data. The analyzing device 23 is based on the contents of known reference video and audio data and can provide known AV data at any time point. The analyzing device 23 utilizes known reference video and audio data as a standard to contrast to the contents of the detected video and audio data and then the synchronization error is shown.

Figure 3:
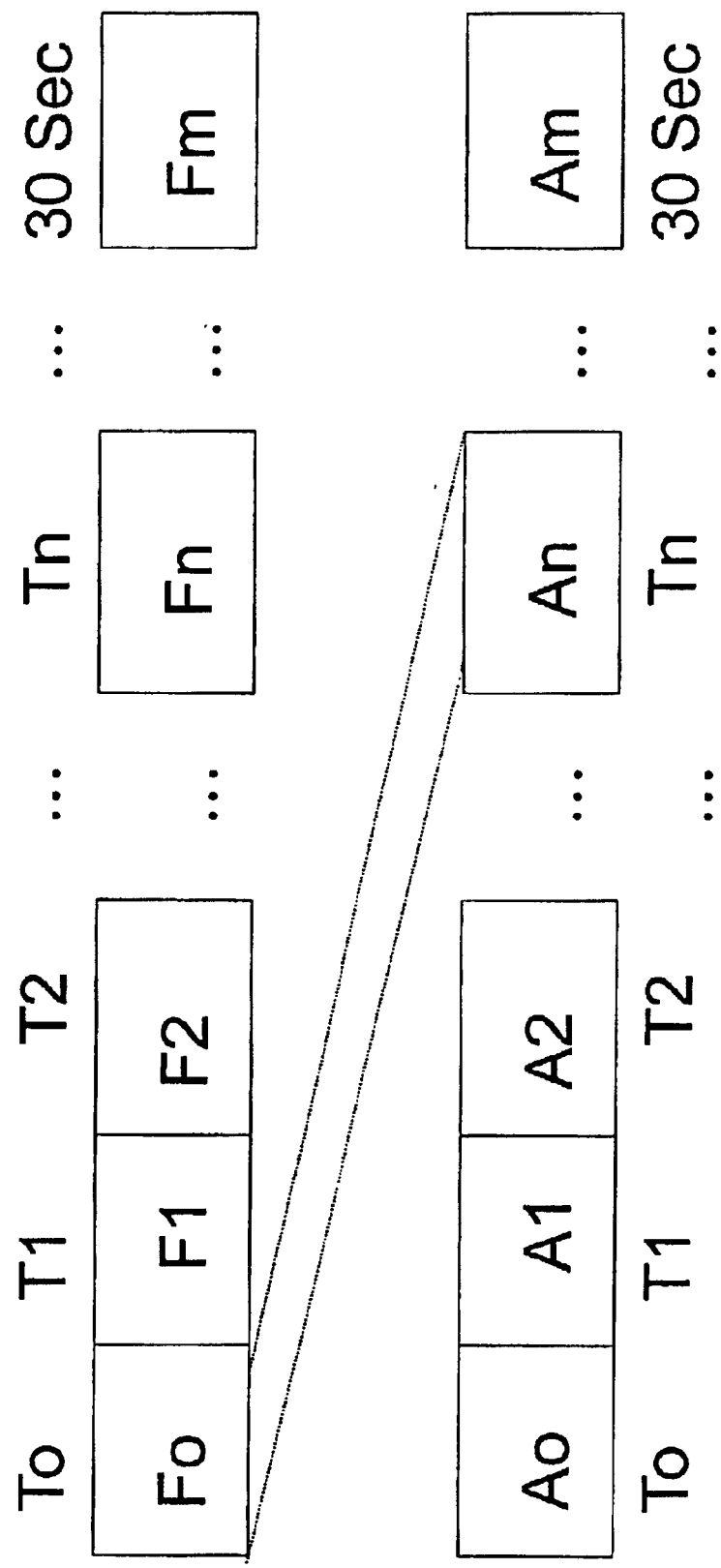
FIG. 3 is a time sequence diagram showing the algorithm in the analyzing package program for measuring the audio and video output synchronization error of an MPEG encoder system in a preferred embodiment according to the present invention.

Please refer to FIG. 3. At the known time point T0, the reference video data is F0 and the reference audio data is A0. If the analyzing device discovers that the detected video data at the known time point T0 is F0 and the detected audio data corresponding to the detected video data at the time point T0 is not A0 but An, which audio data An should be the audio data corresponding to the time point Tn, after analyzing the reference AV data and the detected AV data by the analyzing device, it can be discovered that the synchronization error is Tn−T0. If the synchronization error is positive, it represents that the detected audio data is ahead the detected video data. If the synchronization error is negative, it represents that the detected video data is ahead the detected audio data.

The following explains the tolerant scope of the AV synchronization error calculated by the analyzing tool in the present invention. If $Vt=n*At$, the tolerant scope will be between $-Vt$ to $Vt$ when $n=1$, and will be between $-(Vt*(n-1)/n)$ to $(Vt*(n-1)/n)$ when $n>1$. What is deserved to be mentioned is that the embodiments described above utilize the observation of time difference of the audio data corresponding to the video data at the same time point to judge the synchronization error of the video and audio outputs of the AV encoder system. Similarly, the technology for measuring the AV synchronization error according to the present invention also can utilize the observation of the time difference of the video data corresponding to the audio data at the same time point to judge the synchronization error of the video and obtain the correct measured results.

It will be understood that the technology for measuring audio and video output synchronization accuracy of the AV encoder system relates to utilize the analyzing tool of a readable media recorded on a data processing device to encode the detected AV data which is the AV output of the AV encoder system after inputting the specific designed reference AV data into the AV encoder system through the preferred embodiments described above. Subsequently, utilizing the analyzing program in the analyzing tool to detect the synchronization time point of the detected AV data according to the contents of the known reference AV data and calculate the synchronization error of the AV data. Thus, the present invention substantially provides an automatically detecting and calculating method for measuring the audio and video output synchronization error of the AV encoder system to replace the known technology which utilizes the artificial manner to measure the audio and video output synchronization error of the AV encoder system. Thus, no matter how tiny the audio and video output synchronization error of the AV encoder system is, the measuring technology of audio and video output synchronization error according to the present invention can detect it rapidly and exactly to avoid the introduction of labor power.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for measuring audio and video synchronization error of an audio/video encoder system, said method comprising steps of:

(a) producing a reference video data having a first time length and including a particular image pattern, and a reference audio data having a second time length;

(b) inputting said reference video data and said reference audio data into said audio/video encoder system to produce an encoded video data and an encoded audio data;

(c) processing said encoded video data and said encoded audio data respectively to produce a detected video data having said first time length and including said particular image pattern, and a detected audio data having said second time length; and (d) detecting a first time point of an audio data of said reference audio data synchronized with said particular image pattern of said reference video data and a second time point of an audio data of said detected audio data synchronized with said particular image pattern of said detected video data by an analyzing tool, and calculating a difference between said first time point and said second time point.

2. A method according to claim 1 wherein said step (c) further comprises steps of:

demultiplexing said encoded video data and said encoded audio data respectively to produce an encoded video stream and an encoded audio stream; and decoding said encoded video stream and said encoded audio stream to produce said detected video data having said first time length and including said particular image pattern, and said detected audio data having said second time length.

3. A method according to claim 1 wherein said particular image pattern occupies a part of a video frame in said reference video data.

4. A method according to claim 1 wherein said first time length is a multiple of said second time length.

5. A method for measuring audio and video synchronization error of an audio/video encoder system, said method comprising steps of:

(a) producing a reference video data having a first time length and a reference audio data having a second time length and including a particular audio pattern;

(b) inputting said reference video data and said reference audio data into said audio/video encoder system to produce an encoded video data and an encoded audio data;

(c) processing said encoded video data and said encoded audio data respectively to produce a detected video data having said first time length and a detected audio data having said second time length including and said particular audio pattern; and (d) detecting a first time point of a video data of said reference video data synchronized with said particular audio pattern of said reference audio data and a second time point of a video data of said detected video data synchronized with said particular audio pattern of said detected audio data by an analyzing tool, and calculating a difference between said first time point and said second time point.

6. A method according to claim 5 wherein the step (c) further comprises steps of:

(c1) demultiplexing said encoded video data and said encoded audio data respectively to produce an encoder video stream and an encoded audio stream; and (c2) decoding said encoded video stream and said encoded audio stream to produce said detected video data having said first time length and said detected audio data having said second time length and including said particular audio pattern.

7. A method according to claim 5 wherein said first time length is a multiple of said second time length.

8. A system for measuring audio and video synchronization error of an audio/video encoder system, said system comprising:

an audio/video data supplying device for providing a reference video data having a first time length and including a particular image pattern, and a reference audio data having a second time length;

an audio/video encoder system for receiving said reference video data having said first time length and including said particular image pattern and said reference audio data having said second time length and producing an encoded video data and an encoded audio data; and a data processing device comprising a readable media wherein recording a computer program product is to receive said encoded video data and said encoded audio data, produce a detected video data having said first time length and including said particular image pattern and a detected audio data having said second time length, detect a first time point of an audio data included in said reference audio data synchronized with said particular image pattern included in said reference video data and a second time point of an audio data included in said detected audio data synchronized with said particular image pattern included in said detected video data, and calculate a difference between said first time point and said second time point.

9. A system according to claim 8 wherein said audio/video data supplying device is one of a video CD player and a digital video disk player.

10. A system according to claim 8 further comprising an audio/video playing device for transmitting said reference video data and said reference audio data to said audio/video encoder system via a video output interface.

11. A system according to claim 8 wherein said audio/video encoder system is an encoder system of Moving Picture Experts Group (MPEG).

12. A system according to claim 8 wherein said data processing device is a personal computer.

13. A system according to claim 8 wherein said readable media is one of a fixed storage device and a removable storage device.

14. A system according to claim 8 wherein said first time length is a multiple of said second time length.

15. A system according to claim 8 wherein said computer program product comprises an analyzing tool, said analyzing tool comprising:

an analyzing device for receiving said encoded video data and said encoded audio data and producing a video stream and an audio stream;

an audio decoder device for receiving said audio stream and outputting said detected audio data having said second time length;

a video decoder device for receiving said video stream and outputting said detected video data having said first time length and including said particular image pattern; and an analyzing program, comprising a series of operation instructions for detecting a first time point of an audio data of said reference audio data synchronized with said particular image pattern of said reference video data and a second time point of an audio data of said detected audio data synchronized with said particular image pattern of said detected video data and calculating a difference between said first time point and said second time point.

16. A system for measuring audio and video synchronization error of an audio/video encoder system, said system comprising:

an audio/video data supplying device for providing a reference video data having a first time length and a reference audio data having a second time length and including a particular audio pattern;

an audio/video encoder system for receiving said reference video data having said first time length and said reference audio data having said second time length and including said particular audio pattern and producing an encoded video data and an encoded audio data; and a data processing device comprising a readable media wherein recording a computer program product is to receive said encoded video data and said encoded audio data, produce a detected video data having said first time length and a detected audio data having said second time length and including said particular audio pattern, detect a first time point of a video data included in said reference video data synchronized with said particular audio pattern included in said reference audio data and a second time point of a video data included in said detected video data synchronized with said particular audio pattern included in said detected audio data, and calculate a difference between said first time point and said second time point.

17. A system according to claim 16 further comprising a video-playing device for transmitting said reference audio data and said reference video data to said audio/video encoder system via a video output interface.

18. A system according to claim 16 wherein said computer program product comprises an analyzing tool, said analyzing tool comprising:

an analyzing device for receiving said encoded video data and said encoded audio data and producing a video stream and an audio stream;

an audio decoder device for receiving said audio stream and outputting said detected audio data having said second time length and including said particular audio pattern;

a video decoder device for receiving said video stream and outputting said detected video data having said first time length; and a series of operation instructions for detecting a first time point of a video data of said reference video data synchronized with said particular audio pattern of said reference audio data and a second time point of a video data of said reference video data synchronized with said particular audio pattern of said reference audio data, and calculating a difference of said first time point and said second time point.

19. An analyzing tool stored in a computer program product, comprising:

an analyzing device for receiving a reference video data having a first time length and including a particular image pattern and a system stream produced by a reference audio data having a second time length via an audio/video encoder system and producing a video stream and an audio stream;

an audio decoder device for receiving said audio stream and outputting a detected audio data;

a video decoder device for receiving said video stream and outputting a detected video data including said particular image pattern and having said first time length; and an analyzing program comprising a series of operation instructions for detected a first time point of an audio data of said reference audio data synchronized with said particular image pattern of said reference video data and a second time point of an audio data of said reference audio data synchronized with said particular image pattern of said reference video data and calculating a difference of said first time point and said second time point.

20. An analyzing tool stored in a computer program product, comprising:

an analyzing device for receiving a reference video data having a first time length and a system stream produced by a reference audio data having a second time length and including a particular audio pattern via an audio/video encoder system and producing a video stream and an audio stream;

an audio decoder device for receiving said audio stream and outputting a detected audio data;

a video decoder device for receiving said audio stream and outputting a detected audio data comprising said particular audio pattern and having said second time length; and an analyzing program comprising a series of operation instructions for detecting a first time point of a video data of said reference video data synchronized with said particular audio pattern of said reference audio data and a second time point of a video data of said reference video data synchronized with said particular audio pattern of said reference audio data and calculating a difference of said first time point and said second time point.

* * * * *